United States Patent
Sakashita (10) Patent No.: US 6,510,386 B2
(45) Date of Patent: Jan. 21, 2003

(54) NAVIGATION SYSTEM AND METHOD WITH INTERSECTION GUIDANCE

(75) Inventor: Naohiro Sakashita, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/852,733

(22) Filed: May 11, 2001

(65) Prior Publication Data

US 2001/0049582 A1 Dec. 6, 2001

(30) Foreign Application Priority Data

Jun. 5, 2000 (JP) ........................................ 2000-167471

(51) Int. Cl.[7] .............................................. G01C 21/34
(52) U.S. Cl. ........................................................ 701/211
(58) Field of Search ................................ 701/201, 211; 340/995

(56) References Cited

U.S. PATENT DOCUMENTS

| | | | |
|---|---|---|---|
| 5,938,718 A | * | 8/1999 | Morimoto et al. .......... 340/990 |
| 6,061,628 A | | 5/2000 | Hayashi et al. |
| 6,226,590 B1 | * | 5/2001 | Fukaya et al. ............... 701/209 |
| 6,269,304 B1 | * | 7/2001 | Kaji et al. ..................... 342/70 |
| 6,356,840 B2 | * | 3/2002 | Kusama ....................... 340/995 |
| 6,388,582 B2 | * | 5/2002 | Yamashita et al. ........... 340/901 |

FOREIGN PATENT DOCUMENTS

| JP | A-8-201096 | | 6/1983 |
|---|---|---|---|
| JP | A-8-201095 | | 7/1993 |
| JP | 2000-171263 A | * | 6/2000 |

* cited by examiner

Primary Examiner—Michael J. Zanelli
(74) Attorney, Agent, or Firm—Law Offices of David G. Posz (57) ABSTRACT

In a vehicular navigation system which provides a recommended travel route, a control unit checks for the number of each road branching from an entering road of the travel route at an intersection when the entering road has a plurality of traffic lanes. If an exiting road of the travel route from the intersection has a largest number of traffic lanes among the branching roads, no intersection guidance is provided. If the exiting road has a smaller number of traffic lanes, an intersection guidance is provided. This intersection guidance may include guidance of turn direction and guidance of traffic lane to be taken.

12 Claims, 6 Drawing Sheets

TAKE RIGHT-SIDE LANE AND MOVE FORWARD RIGHT AT 700m AHEAD

NOT COUNTED

FIG. 7F

NAVIGATION SYSTEM AND METHOD WITH INTERSECTION GUIDANCE

CROSS REFERENCE TO RELATED APPLICATION

This application is based on and incorporates herein by reference Japanese Patent Application No. 2000-167471 filed on Jun. 5, 2000.

BACKGROUND OF THE INVENTION

The present invention relates to a vehicular navigation system and method that provides a guidance of a recommended vehicle travel route to a destination, and more particularly to a system and method that provides guidance of intersections on the recommended vehicle travel route.

Various vehicular navigation systems are proposed and used to provide a recommended vehicle travel route to a destination, thereby navigating vehicle drivers to the destination. Some of the navigation systems also provide guidance of intersections which appear on the travel route. Such guidance include voice guidance which indicates name of the intersection, distance to the intersection, direction of turn at the intersection, or the like.

This guidance of intersection is provided only for intersections which are more likely to cause drivers to leave the recommended travel route without the guidance. These intersections are determined by checking a road relation between a road entering the intersection and roads exiting from the intersection. The road relation may be defined based on road classes (e.g., national, prefectural, city), angles of crossing, or the like. However, this intersection determination sometimes does not match the sense of drivers.

SUMMARY OF THE INVENTION

It is an object of the present invention to provide a vehicular navigation system and method that makes a road relation determination matching a sense of drivers.

It is another object of the present invention to provide a vehicular navigation system and method which makes a road relation determination based on the number of lanes of a road and, when necessary, provides a lane guidance in addition to intersection guidance.

According to the present invention, a vehicular navigation system has a control unit that determines and provides a recommended travel route. The control unit checks for the number of each road branching from an entering road of the travel route at an intersection when the entering road has a plurality of traffic lanes. If an exiting road of the travel route from the intersection has a largest number of traffic lanes among the branching roads, no intersection guidance is provided. If the exiting road has a smaller number of traffic lanes, an intersection guidance is provided. This intersection guidance may include guidance of turn direction and guidance of traffic lane to be taken.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
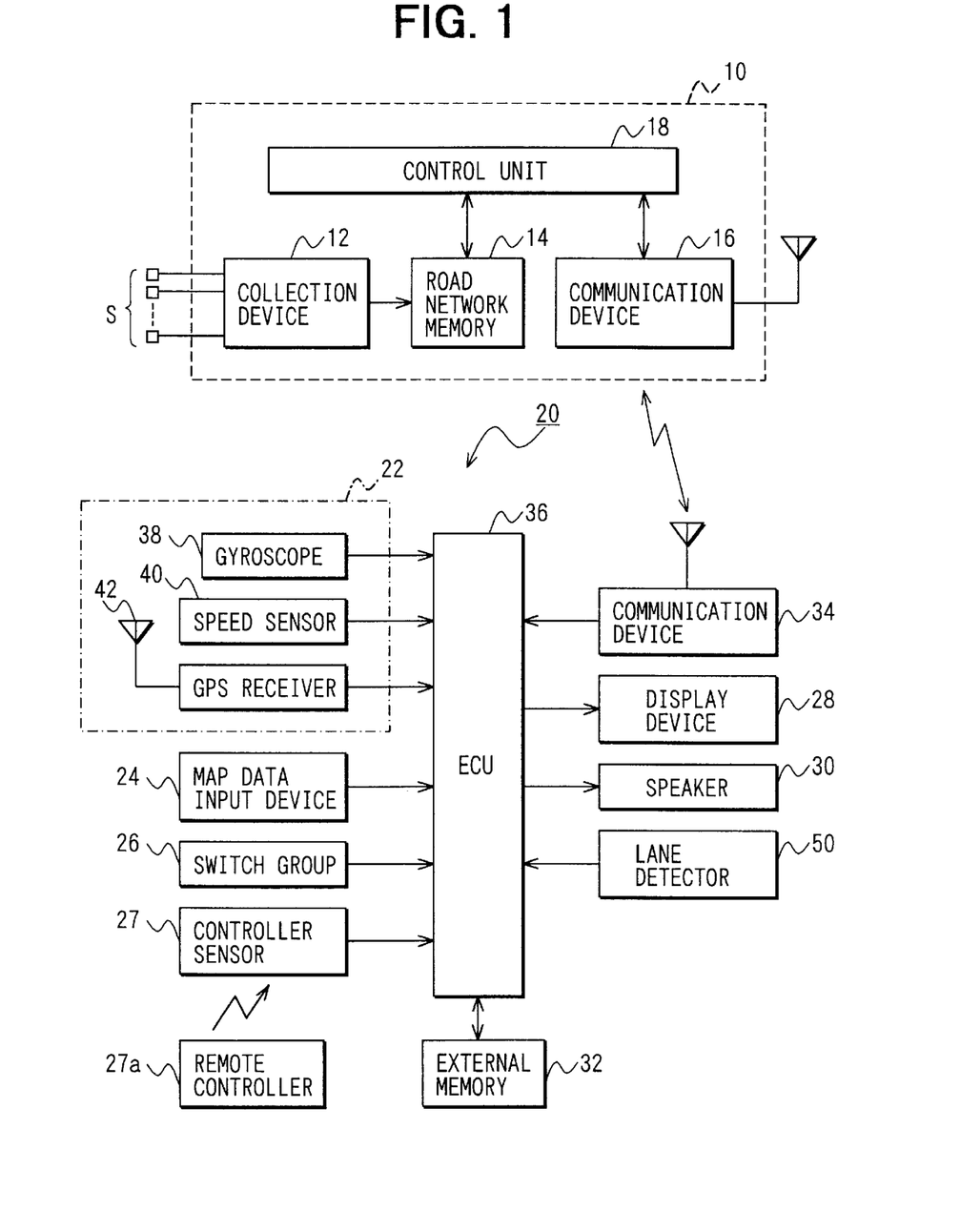
FIG. 1 is a block diagram showing a vehicular navigation system according to an embodiment of the present invention.

Referring first to FIG. 1, a vehicular navigation system is denoted with reference numeral 20. The navigation system 20 includes a position detector 22, a map data input device 24, operation switch group 26, a remote controller sensor 27, a display device 28, a speaker 30, an external memory 32, a communication device 34, an electronic control unit (ECU) 36, and a traveling lane detector 50.

The position detector 22 has a gyroscope 38, a vehicle speed sensor 40, and a GPS (global positioning system) receiver 42 which detects vehicle positions based on radio signals from satellites. Those devices 38, 40 and 42 are used in combined form to compensate for errors which each device has. The devices may be limited to only one, or additional devices such as a terrestrial magnetism sensor, a steering angle sensor or vehicle wheel speed sensors may be used.

The map data input device 24 stores therein road map data. The map data includes road connection data (road network data), map matching data for improving accuracy of position detection, and the like. The memory 24 may be a CD-ROM, a DVD, a semiconductor memory card or the like.

The road network data includes link (road) information, node (intersection) information, and inter-link connection information. The link information comprises a number of information regarding each link. Specifically it comprises a "link ID" which specifies each link, a "link class" which indicates the type of each link, "start point coordinates" and "end point coordinates" of each link, a "link length" indicative of the length of each link, and the like. The link class identifies whether a link is an expressway, a toll road, a general road, an attached road or the like. The node information comprises a "node ID" which specifies each node connecting the links, information about no right or left turn and about traffic light at each intersection, and the like.

The link information further comprises information about lanes (the number and direction of lanes). The inter-link connection information comprises, for instance, information about no vehicle entry due to one-way traffic. It is to be noted that, in the case of one-way traffic, the link is available for vehicle travel from one link but not form another link. Therefore, availability of the link for vehicle travel is determined based on the inter-link connection information.

The operation switch group 26 includes various switches which instruct operation of the navigation system 20. Specifically it includes a switch for switching a display content on the display device 28, a switch for setting a destination by a driver, and the like. The switches may be a mechanical-type or a touch sensor-type integrated with the display device 28.

The remote controller sensor 27 is provided for receiving signals form a remote controller 27a having various switches through which a driver inputs various commands. The remote controller 27a enables drivers to input the same commands therethrough in the same manner as through the switch group 26.

The display device 28 is provided to display a road map retrieved from the map data input device 24, a present vehicle position mark indicative of the present vehicle position detected by the position detector 22, a vehicle travel destination mark, a recommended travel route from the present position to the destination, and the like. The present position mark, the destination mark and the recommended travel route are displayed on the displayed road map.

The speaker 30 is provided to issue travel guidance in vocal sounds in addition to the visual indication on the display device 28. For instance, when a right turn is to be indicated at the next intersection, the display device 28 displays a right-directed mark on the next intersection on the displayed road map and the speaker 30 announces "Please make a right turn at the next intersection."

The communication device 34 is provided to receive information from an information station 10 for a vehicle information and communication system (VICS) and to transmit information to external sites. The information received from the external sites are processed in the electronic control unit 36 to determine the recommended travel route. The communication device 34 may be a customized receiver or a mobile communication device such as a car phone or a cellular phone.

The electronic control unit 36 is a microcomputer which has a CPU, a ROM, a RAM, an I/O, a bus, and the like. The control unit 36 processes signals applied from the position detector 22, the map data input device 24, the switch group 26, the remote controller sensor 27 and the communication device 34 to determine the recommended travel route and to control the display device 28 and the speaker 30. The determined recommended travel route is stored in the external memory 32 which is backed up by a battery (not shown).

The traveling lane detector 50 detects a lane (position) of a road on which the vehicle is traveling. The traveling lane may be detected by a video camera mounted on a vehicle front side. It may alternatively be detected by receiving information from beacons and checking from which beacon the information is received, if beacons are installed on each lane of the road. It is also possible to detect the traveling lane from the present position calculated by the control unit 36 based on the outputs of the position detector 22.

The information station 10 includes an external condition collection device 12, a road network data memory 14, a communication device 16, and a control unit 18. The information collection device 12 is provided to collect external conditions such as road conditions detected by various sensors S provided along road sides. The network data memory 14 is provided to store various traffic information compiled from various traffic regulations and the external conditions collected by the information collection device 12 as well as a road map in a center area. The communication device 16 is provided to communicate with the navigation system 20 through a wireless device such as a car phone, a cellular phone or the like. The control unit 18 is provided to specify roads which are under traffic regulations or in traffic congestion from the position data (present position and destination) received from the navigation system 20 and the information stored in the road network data memory 14. The control unit 18 transmits those information to the navigation system 20 to be used in the recommended travel route determination.

In the navigation system 20, when a driver inputs a destination of vehicle travel through manipulation of operation switch group 26, the control unit 36 automatically determines the recommended travel route from the present position to the destination and indicates the determined route on the display device 28 and through the speaker 30 as a travel route guidance.

This route guidance includes guidance of intersections which appears when the vehicle takes the recommended travel route. The intersection guidance includes guidance of turn directions and guidance of lanes. The turn direction indication may be "Turn to a forward right direction at 70 meters ahead." The lane guidance may be "Take a right side lane" before turning to the right, when the road has a plurality of lanes. With those guidance, the driver is enabled to travel the intersection most appropriately.

The control unit 36 is programmed to execute the following processes and routines shown in FIGS. 2 to 6 for the above route and intersection guidance. The control unit 36 repeats to execute the process shown in FIG. 2.

Figure 2:
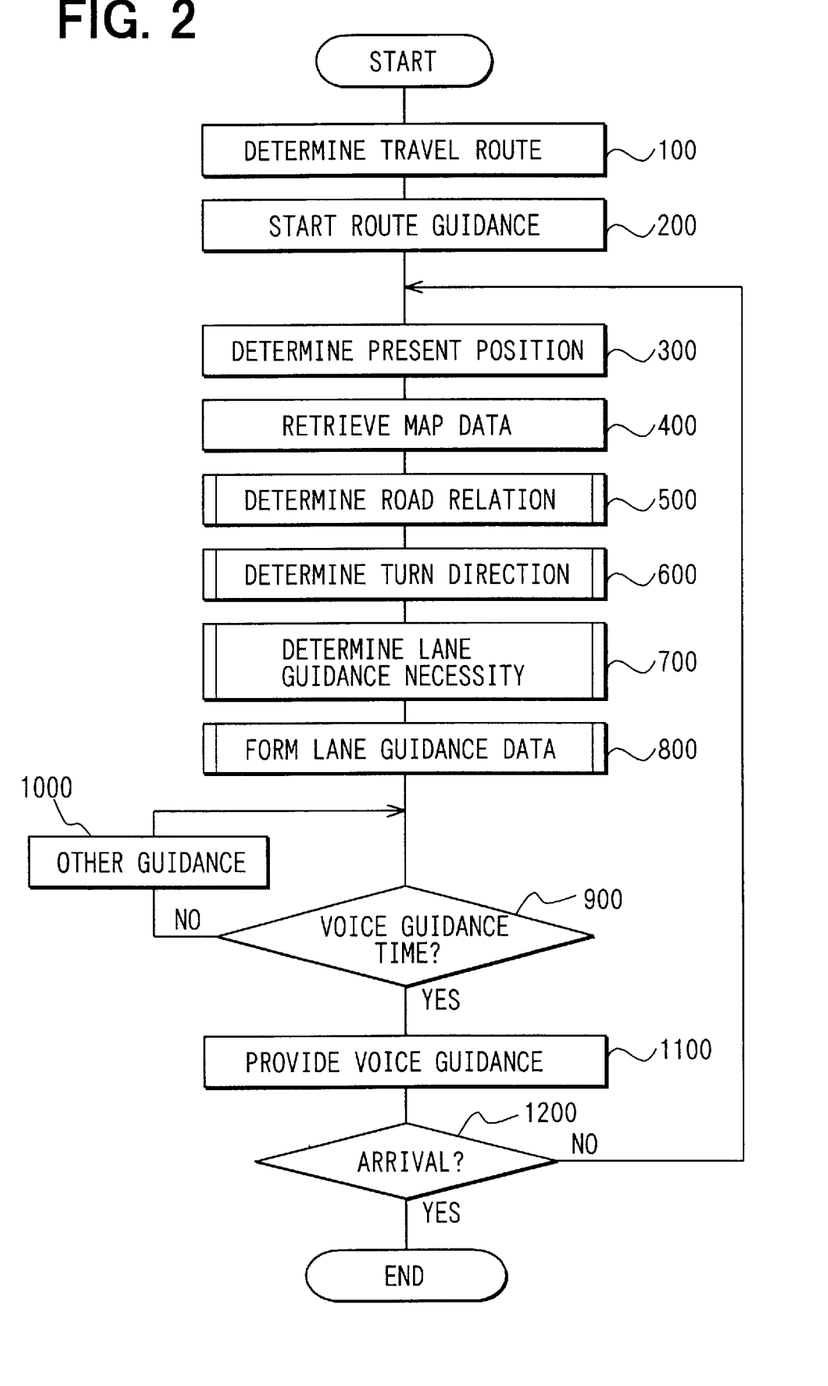
FIG. 2 is a flow diagram showing a recommended travel route determination and guidance process executed in the embodiment shown in FIG. 1.

The control unit 36 first determines at step 100 a recommended travel route to a destination in a known manner, when the destination is set by a driver. Specifically, when the destination is input on the road map displayed on the display device 28, the present position of the vehicle is calculated by using the satellite data received from the GPS receiver 24. The recommended travel route (e.g., shortest travel route with lowest cost) from the present position to the destination is calculated by using the Dijkstra method for a route guidance.

The control unit 36 starts to provide the route guidance at step 200. As the vehicle travels, the control unit 36 determines the present position at step 300 and retrieves a map data at step 400 from time to time. This map data covers The the present position and a position a predetermined distance away from the present position in a direction of the destination. The control unit 36 then determines a road relation of a coming intersection which lies ahead in the recommended travel route by executing a road relation determination routine 500.

Figure 3:
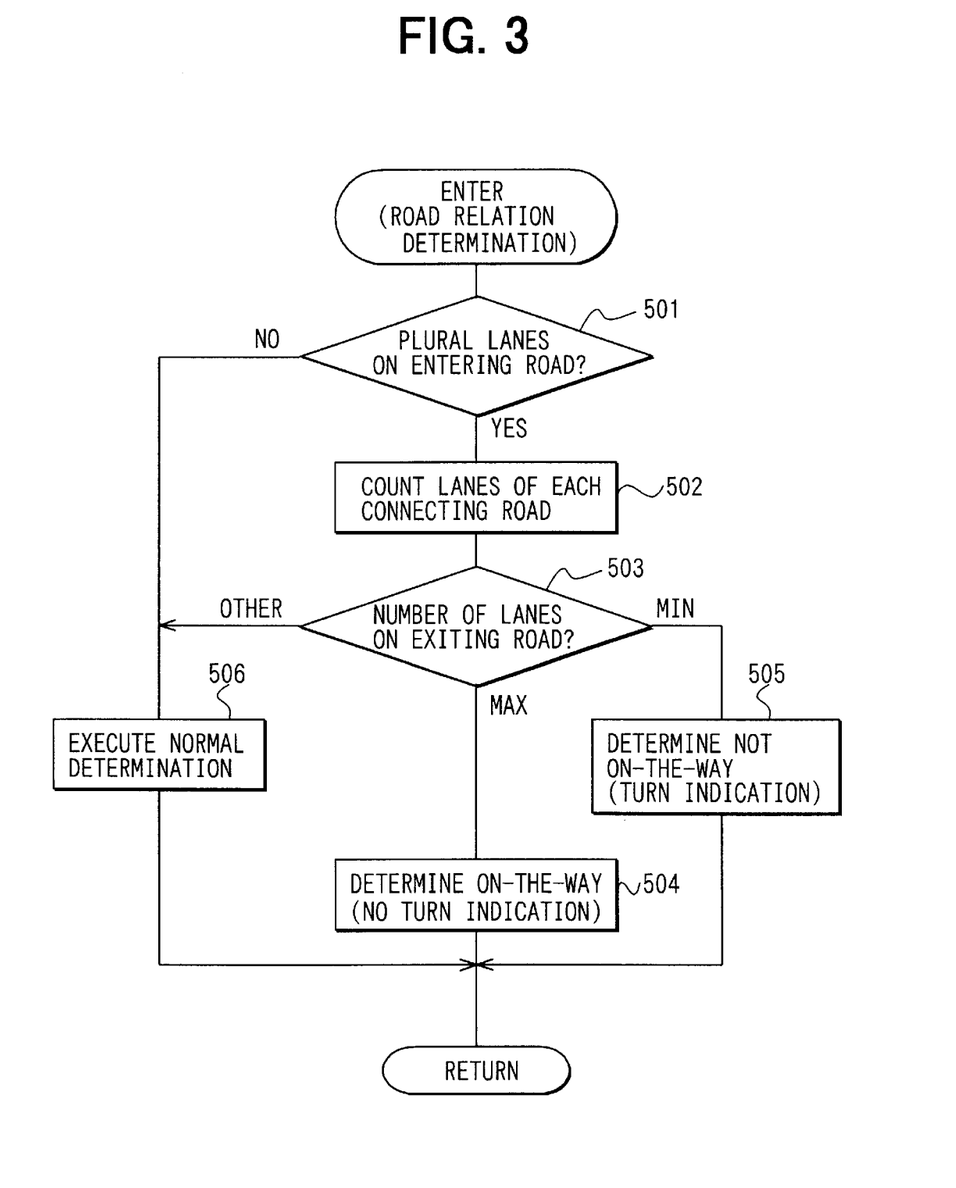
FIG. 3 is a flow diagram showing a road relation determination routine executed in the process shown in FIG. 2.

This road relation determination routine is shown in FIG. 3 in detail. In this routine, the control unit 36 checks first at step 501 whether the present road entering the intersection has plural traffic lanes. This check is made with reference to the lane information which is included in the link information in the road network data of the map data.

If the entering road has a single traffic lane (step 501: NO), the control unit 36 executes a normal road relation determination at step 506. This normal determination is made with reference to the angle between the entering road and the exiting road of the recommended travel route, the classes (national road, prefectural road, etc.) of the entering road and the exiting road, and the like. For instance, the recommended travel route is determined with higher possibility to be on-the-way, as the angle between the entering road and the exiting road is smaller. The recommended travel route is determined with higher possibility to be on-the-way, if both the entering road and the exit road are national roads although the entering road is also connected to a prefectural road at the intersection. Further, the recommended travel route may be determined to be on-the-way by combining the above determinations, if the national road should be taken as the exiting road although it crosses the entering road with a large angle.

Figure 7A:
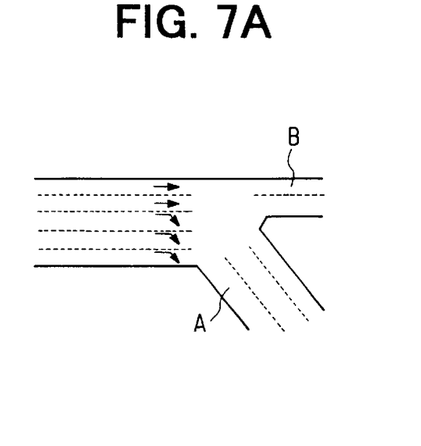
FIGS. 7A to 7F are schematic diagrams showing various types of intersections.
Figure 7B:
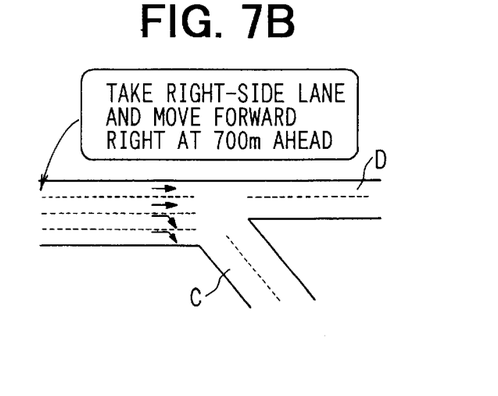

For instance, in the case of road connection shown in FIG. 7A, two roads A and B connected with the entering road at the intersection are in the same road class (national road), but the roads A and B have different number of traffic lanes, three and two, respectively. The road B is more likely to be determined on-the-way, because of its straightness (less crossing angle) with the entering road. However, it will match the driver's sense if the road A is determined to be on-the-way, particularly when more vehicles take the road A.

If the entering road has a plurality of traffic lanes (step 501: YES), the control unit 36 counts at step 502 the number of traffic lanes of each road (exiting road and other branch roads) connected to the intersection. The control unit 36 then checks the count number of each road. If the exiting road has the largest number of traffic lanes among the checked roads (step 503: MAX), the control unit 36 determines at step 504 that the exiting road is on-the-way. In this instance, the control unit 36 does not cause the display device 28 and the speaker 30 to make an indication of right or left turn. If the exiting road has the smallest number of traffic lanes among the checked roads (step 503: NO), the control unit 36 determines at step 505 that the exiting road is not on-the-way. In this instance, the control unit 36 causes the display device 28 and the speaker 30 to make the indication of right or left turn. If the number of traffic lanes of the exiting road is not the largest nor smallest, the control unit 36 executes the normal determination at step 506.

Figure 7C:
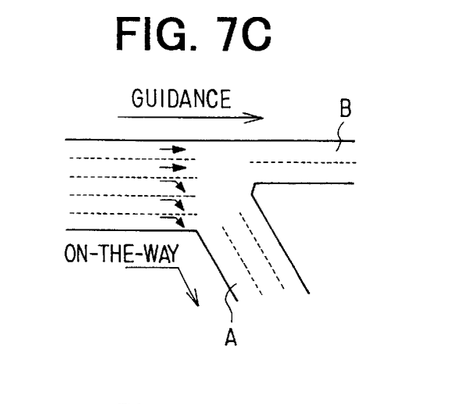
Figure 7D:
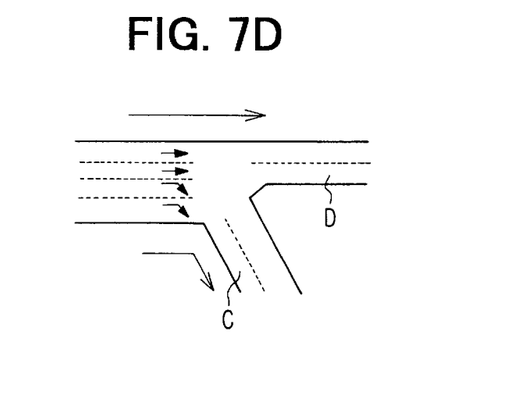

It is assumed that the entering road connects to two roads at the intersection as shown in FIGS. 7C and 7D. In the case of FIG. 7C, the roads A and B have three traffic lanes and two traffic lanes, respectively. If the road A is an exiting road, the road A is determined to be on-the-way at step 504. If the road B is an exiting road, the road B is determined to be not on-the-way and therefore some guidance is provided at step 505. In the case of FIG. 7D, both roads C and D have two traffic lanes. In this instance, the normal road relation determination is made at, step 506 whether the road C or D is set as the exiting road. That is, as long as the road classes of the roads C and D are the same, the road D is determined to be on-the-way because of its straightness with the entering road if the road D is set as the exiting road. The road D is determined to be not on-the-way, if the road C is set as the exiting road.

Figure 4:
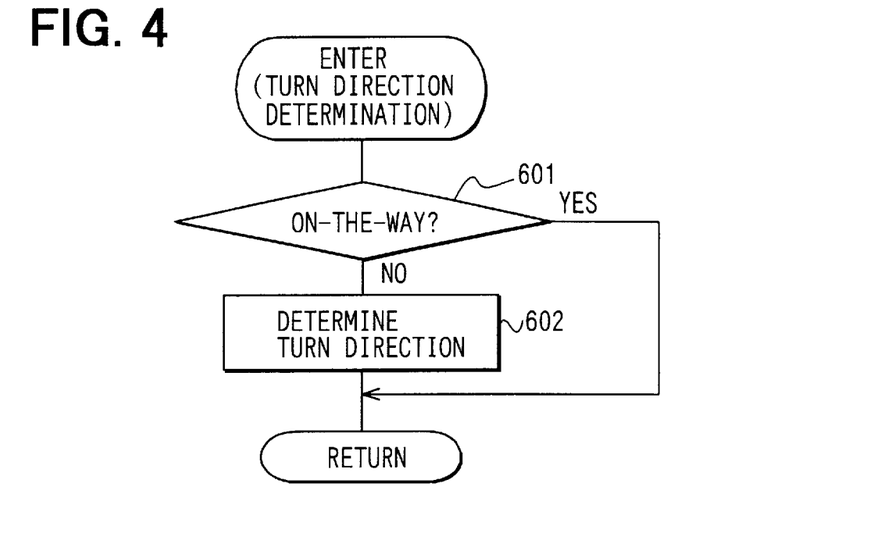
FIG. 4 is a flow diagram showing a turn direction determination routine executed in the process shown in FIG. 2.

Following the above road relation determination routine 500 (FIG. 3), the control unit 36 executes a turn direction routine 600. In this routine, as shown in FIG. 4, the control unit 36 first checks at step 601 whether the exiting road is on-the-way based on the result of the road relation determination routine 500 (FIG. 3). If it is on-the-way (step 601: YES), the control unit 36 ends this routine. If it is not on-the-way (step 601: NO), the control unit 36 determines a turn direction (right or left) based on the directional relation between the exiting road and other branching roads connected to the intersection.

Figure 5:
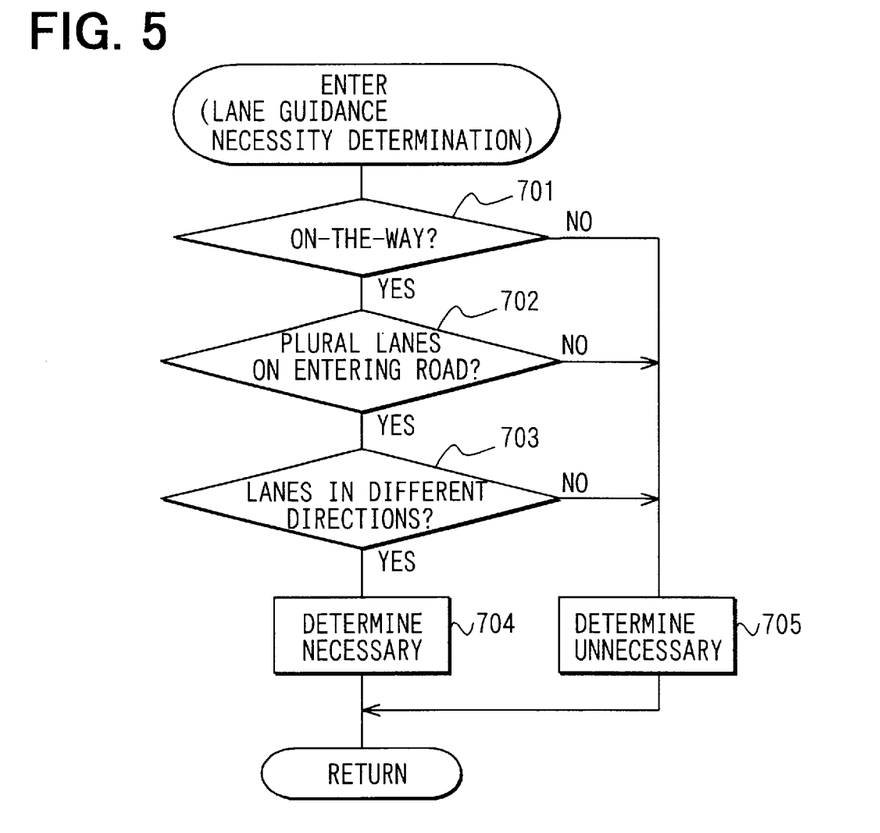
FIG. 5 is a flow diagram showing a lane guidance determination routine executed in the process shown in FIG. 2.
Figure 7E:
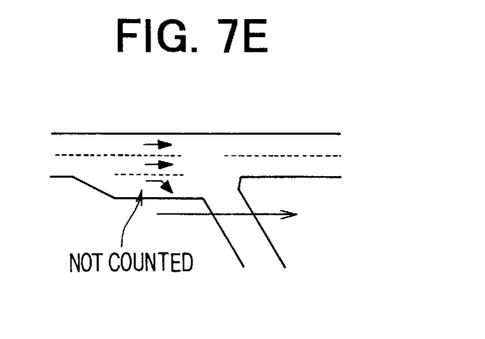

The control unit 36 then executes a lane guidance necessity determination routine 700. In this routine, as shown in FIG. 5, the control unit 36 checks at step 701 whether the exiting road is on-the-way based on the result of the road relation determination routine 500 (FIG. 3). If the exiting road is not on-the-way (step 701: NO), the control unit 36 determines at step 705 that no guidance is necessary. If the existing road is on-the-way (step 701: YES), the control unit 36 checks at step 702 whether the entering road has a plurality of lanes. This checking may be made with reference to the lane information (the number and direction of each lane) in the same manner as in step 501. In counting the number of lanes, lanes which appear immediately preceding the intersection are not counted. For instance, the right-most lane in the travel direction in FIG. 7E is not counted, and the number of lanes is counted as two.

If the entering road has a plurality of lanes (step 702: YES), the control unit 36 further checks at step 703 whether the lanes have different travel directions. In this checking also, the lane existing only preceding the intersection is not checked with its direction. This is because the driver will readily recognize that such a lane is provided specially to be exclusive to the right or left turn and will not necessitate any guidance. If the lanes have different travel directions (step 703: YES), the control unit 36 determines at step 704 that a lane guidance is necessary.

Figure 7F:
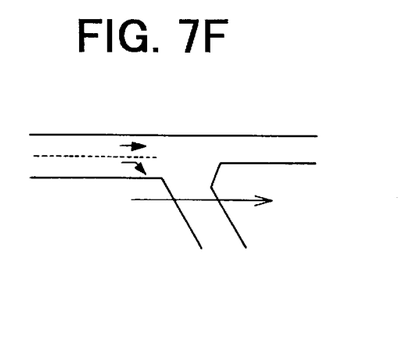

The control unit 36 determines at step 705 that the lane guidance is unnecessary, if the exiting road is not on-the-way (step 701: NO), the entering road has a single lane (step 702: NO), or all the lanes are in the same direction (step 703: NO). For instance, in the case of FIG. 7E, the right-most lane is eliminated from the checking at steps 702 and 703. As a result, the control unit 36 determines that the lane guidance is unnecessary. However, in the case of FIG. 7F, the entering road has two lanes but these lanes are directed in different directions. Therefore, the control unit 36 determines that the lane guidance is necessary.

Figure 6:
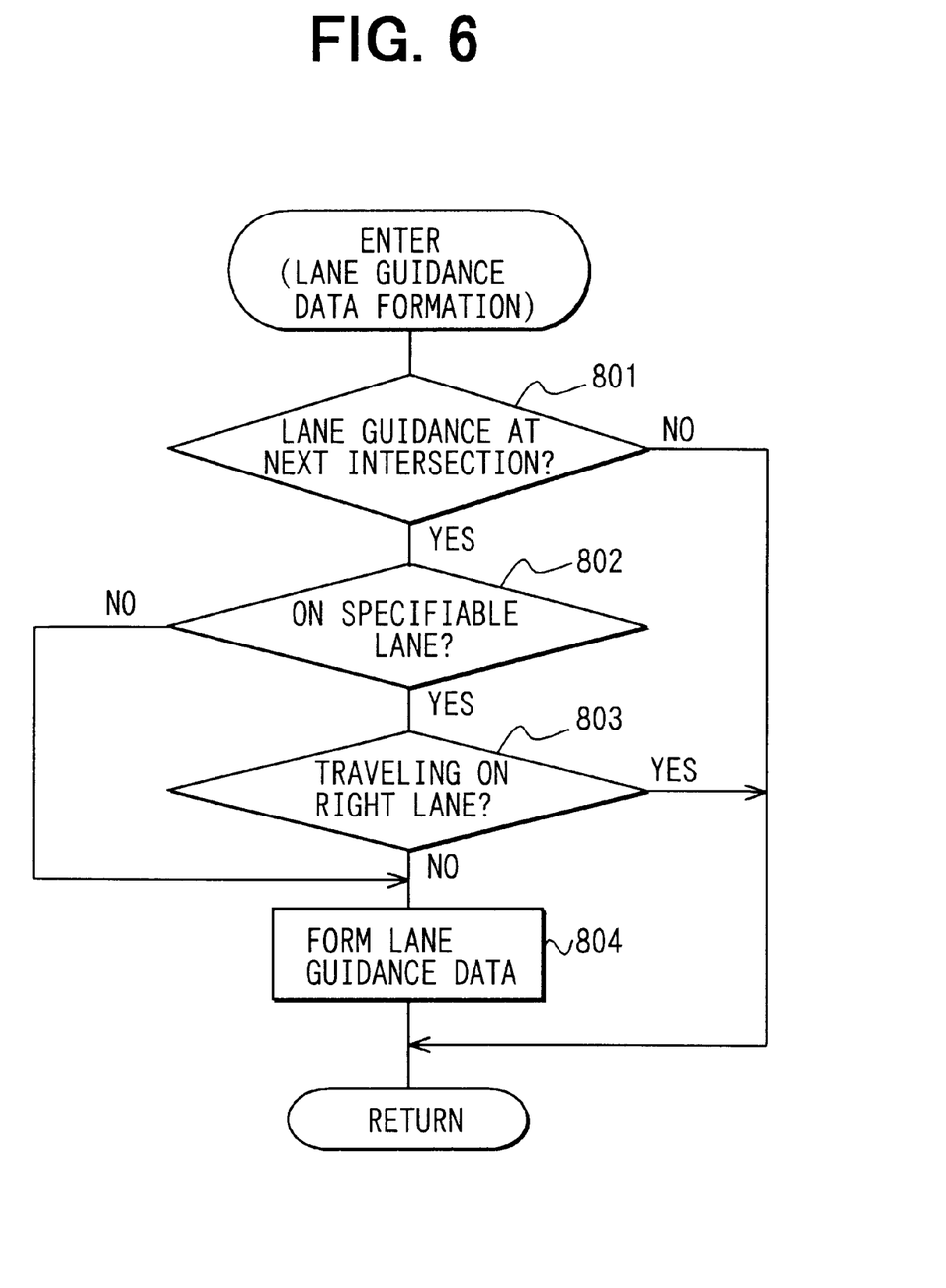
FIG. 6 is a flow diagram showing a lane guidance data formation routine executed in the process shown in FIG. 2.

Following the lane guidance necessity determination routine 700 (FIG. 5), the control unit 36 executes a lane guidance data formation routine 800 as shown in FIG. 6. The control unit 36 first checks at step 801 whether the next intersection is a lane guidance point. If it is not the lane guidance point (step 801: NO), the control unit 36 ends this routine. If it is the lane guidance point (step 801: YES), the control unit 36 checks at step 802 whether the present travel lane of the entering road is specifiable by referring to the detection output of the travel lane detector 50. In this step 802, the control unit 36 analyses the video image of front view of the vehicle taken by the lane detector 50 thereby to detect lane marks, and specifies the present travel lane from positional relation among the detected lane marks. If the present travel lane is specifiable (step 802: YES), the control unit 36 checks at step 803 whether the vehicle is on the right lane, that is, whether it is possible to continue to take the present lane as a travel on the recommended travel route to the destination without changing traffic lanes. If the present lane is a right one (step 803: YES), the control unit 36 ends this routine because it is not necessary to form lane guidance data. If the present lane is not specifiable (step 802: NO) or not the right one (step 803: NO), the control unit 36 forms the lane guidance data at step 804.

In this lane guidance data formation routine, checking steps 802 and 803 may be eliminated so that the lane guidance data is formed for each intersection irrespective of whether the vehicle is on the right lane or not.

Following the lane guidance data formation routine 800 (FIG. 6), the control unit 36 checks at step 900 whether it is the time to provide a voice guidance. In this checking step 900, the control unit 36 checks whether either the guidance of turn direction (right or left) or the guidance of lane is necessary. If at least one of the guidance is necessary (step 900: YES), the control unit 36 further checks whether the present vehicle position is at a predetermined distance preceding to the next intersection. If it is not the voice guidance time (step 900: NO), the control unit 36 continues to execute other guidance at step 1000. If it is the voice guidance time (step 900: YES), the control unit 36 executes the voice guidance at step 1100. This voice guidance is only one of or both of the turn direction guidance and the lane guidance as the case may be. At guidance steps 900 and 1000, the guidance may also be provided by the display device 28 in addition to the speaker 30.

The control unit 36 checks at step 1200 whether the vehicle arrived at the destination. If it arrived (step 1200: YES), the control unit 36 ends this process. If not (step 1200: NO), the control unit 36 repeats the above process of steps 300–1200.

In the above embodiment, the navigation system 20 performs the route guidance by checking whether a road is on-the-way in consideration of the number of lanes of roads which precede and follow intersections. As a result, the route guidance becomes more matching with the sense of drivers. That is, in the case of road connections shown in FIGS. 7A and 7C, the road B is determined to be on-the-way if only the angle of crossing of roads or the class of roads is considered. However, in the case that the road A has more traffic lanes than the road B and more vehicles take the road A, it matches more with the sense of drivers that the road A is determined to be on-the-way. For this reason, the number of lanes is checked at step 503 and the road A is determined to be on-the-way at step 504, so that the travel route guidance and lane guidance before arriving intersections is provided more appropriately.

The present invention should not be limited to the disclosed embodiment, but may be modified in various ways.

What is claimed is:

1. A vehicular navigation system comprising:
   means for determining a recommended travel route to a destination;
   means for checking whether an intersection on the travel route is a guidance intersection which requires a guidance; and
   means for providing a predetermined travel guidance about the guidance intersection when approaching the guidance intersection,
   wherein the checking means includes:
      first means for checking a relation of continuity of roads connected to the guidance intersection in consideration of the number of traffic lanes of each road; and
      second means for causing the providing means to provide a guidance of turn direction at the guidance intersection when the travel route is determined to be not on-the-way because of no continuity of roads at the guidance intersection.

2. The vehicular navigation system as in claim 1, wherein:
   the checking means determines the travel route to be on-the-way when an entering road of the travel route to the guidance intersection has a plurality of traffic lanes and an exiting road of the travel route from the guidance intersection has a maximum number of traffic lanes among roads which branch from the entering road at the guidance intersection; and
   the checking means determines the travel route to be not on-the-way when the entering road has a plurality of traffic lanes and-the exiting road has a minimum number of traffic lanes among the roads which branch from the entering road at the guidance intersection.

3. The vehicular navigation system as in claim 1, wherein the checking means includes:
   third means for checking whether a lane guidance is necessary for indicating a lane to be taken and causing the providing means to provide the lane guidance at the guidance intersection when the lane guidance is determined to be necessary.

4. The vehicular navigation system as in claim 3, wherein:
   the third means performs a checking operation thereof when the travel route is on-the-way and when the travel route is not on-the-way.

5. The vehicular navigation system as in claim 3, wherein:
   the third means determines that the lane guidance is necessary when the entering road has a plurality of traffic lanes and the lanes are directed to different directions.

6. The vehicular navigation system as in claim 3, further comprising:
   means for detecting a lane which is taken presently among lanes of an entering road of the travel route to the guidance intersection, and
   wherein the third means disables the providing means to provide the lane guidance when the detected lane is directed in the same direction as an exiting road of the travel route from the guidance intersection.

7. The vehicular navigation system as in claim 6, wherein:
   the third means causes the providing means to provide the lane guidance when the detecting means fails to detect the lane.

8. The vehicular navigation system as in claim 3, wherein:
   the third means eliminates, in a checking operation thereof, a lane which exists only around the guidance intersection.

9. The vehicular navigation system as in claim 1, wherein:
   the first means eliminates, in a checking operation thereof, a lane which exists only around the guidance intersection.

10. A vehicular navigation method comprising the steps of:
    determining a recommended travel route to a destination, the travel route including an intersection where an entering road and an exiting road of the travel route is connected;
    checking a relation between the entering road and the exiting road in consideration of the number of traffic lanes of the exiting road relative to other roads branching from the intersection;
    providing an intersection guidance before entering the intersection when the exiting road has less number of traffic lanes than the other roads so that the exiting road should be taken from the intersection.

11. The vehicular navigation method as in claim 10, wherein:
    the checking step performs a checking operation thereof only when the entering road has a plurality of traffic lanes; and
    the guidance providing step provides a guidance of traffic lane to be taken on the entering road before entering the intersection, when a present traffic lane on the entering road is directed in a different direction from that of the exiting road.

12. The vehicular navigation method as in claim 10, wherein:
    the guidance providing step is disabled to provide the intersection guidance before entering the intersection when the exiting road has a largest number of traffic lanes among the other roads.

* * * * *